UNITED STATES PATENT OFFICE

EDGAR D. DOYLE, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA

APPARATUS FOR CONTROLLING LOAD DISTRIBUTION

Application filed September 19, 1929. Serial No. 393,650.

My invention relates to the control or regulation of load of one or more energy converting or translating units or systems, specifically electrical generating systems, and more particularly to the apportionment or distribution of load between two or more units.

In accordance with my invention, electrical forces, as voltages, each substantially proportional to the individual loads of a group of generators supplying current to a common system, are balanced against an electrical force, as a voltage, proportional to the group load, and the unbalanced forces, or voltages, utilized to control the individual alternators to effect or maintain a desired ratio between the individual loads of the alternators.

More specifically, the inputs of the several generators, specifically alternators, are each varied in accordance with the unbalance between the potential drop through an impedance or resistance in an electrical network, as a potentiometer system, which voltage varies the alternator load, and a potential drop between other points in the network, which is proportional to the group load.

Further in accordance with some modifications of my invention, the unbalanced voltages are each introduced into a frequency-responsive network, as an alternating-current Wheatstone bridge, so that each generating unit is controlled in accordance with the system frequency and the load distribution between the units.

Also in accordance with my invention, the control of an alternator by a frequency responsive network may be modified by the introduction of a voltage into the network which varies with the alternator load, and more specifically this voltage is effectively in series opposition with a voltage proportional to the total load of several alternators.

My invention also resides in systems, and features of arrangement hereinafter described and claimed.

For an illustration of some of the applications of my invention, reference is to be had to the accompanying drawings, in which.

Figure 1:
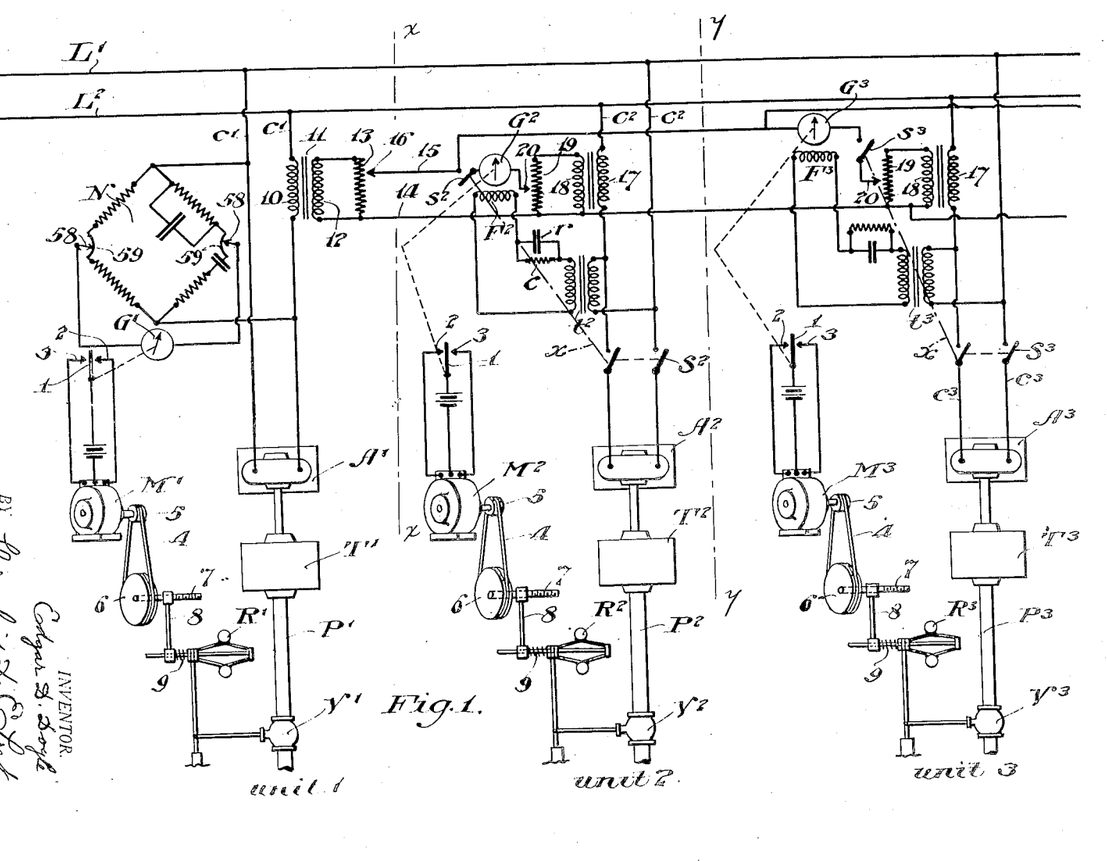
Fig. 1 represents diagrammatically a group of electrical generating units or systems controlled in accordance with my invention.

Referring to Fig. 1, the generators A1, A2 and A3, specifically alternators, supply current to a common system represented by conductors L1, L2. The alternators are driven by prime movers, T1, T2 and T3, for example turbines, connected to the same or different steam generators, not shown, through pipes P1, P2 and P3; valves V1, V2 and V3 controlling the flow of steam to the turbines as hereinafter described.

To the feeder conductors C1, C1 from alternator A1 are connected points of an alternating current Wheatstone bridge N, conjugate points of which are connected to a galvanometer G1. Movement of the movable element of the galvanometer G1 in response to unbalance of the bridge, is utilized as hereinafter described, and originally claimed in co-pending Wunsch application Serial No. 18,794, filed March 27, 1925, to control the position of a movable contact 1 adapted to engage selectively contacts 2 or 3, which constitute therewith a reversing switch controlling energization of a motor M1. A governor mechanism R1 driven by turbine T1 controls position of the throttle valve V1 to maintain the frequency of the alternator A1 within a narrow range of frequencies. Departure of the frequency of the alternator A1 from a fixed or predetermined magnitude, usually within the above mentioned band of frequencies, effects unbalance of the bridge N or equivalent network. The movable element of the galvanometer G1 moves in a sense, and preferably also to an extent, determined by the sense and extent of the unbalance of the bridge to effect engagement between contact 1 and either of contacts 2 or 3 to effect rotation of the rotor of the motor M1 in a direction, and preferably also to an extent, suitably to change the bias upon or setting of the governor mechanism R1.

The mechanism for transmitting movement of the rotor of the motor M1 may, for example, comprise a belt 4, chain or the like for connecting the rotor pulley 5 and a pulley 6 mounted on a shaft 7 which threadably engages one end of a rod 8 whose other end bears against a biasing spring 9 interposed therebetween and the flyball structure of the governor mechanism R1. Alternatively, the motor M1 may control the position of the throttle valve V1, or a supplemental flow-control means which expedients per se are known in the art. The system thus far described maintains substantially constant the frequency of the alternator A1, for changes in load upon the system L1, L2, etc. and is per se claimed in the aforesaid Wunsch application.

In one of the feeders C1 is included the primary 10 of the current transformer 11 across whose secondary 12 is connected a potentiometer, impedance, or resistance 13. Conductors 14 and 15 of a control circuit are connected respectively to a terminal of the resistance 13, and a contact 16 slidable along the resistance and in engagement therewith.

For the purposes of explanation, the apparatus thus far described will be hereinafter referred to as the master unit, or unit #1. It may be located in the same station as any one or more of the controlled units to be described, or may be remote therefrom. The generating unit 2 between broken line $x$, $y$ may be of the same capacity as unit #1, or smaller or larger, as may be desired. In one of the feeder conductors C2 connecting the alternator A2 to the line wires L1 and L2, is included primary 17 of a current transformer across whose secondary 18 is connected a potentiometer resistance 19 whose lower terminal is connected as shown to the conductor 14 of the control circuit. The terminals of resistance 13 and 19 connected by conductor 14 are of the same polarity and substantially of the same potential. A galvanometer G2 is connected to conductor 15 of the control circuit, and to a contact 20 manually adjustable along resistance 19, the field winding F2 thereof being energized by a transformer $t2$ whose primary is connected across feeder conductors C2, C2 and whose secondary is connected in series with the field winding F2 and a compensating circuit $c$, $r$, the capacity and resistance of which is of such magnitude and so proportioned as to effect proper phase relation of the current through field winding F2, with respect to the current through the movable coil of galvanometer G2.

Assuming that the loads upon the alternators A1 and A2 bear a desired or predetermined relation with respect to each other, the adjustable contacts 16 and 20 are in such position that they are of the same potential and there is therefore no flow of current through galvanometer G2. Upon change in load upon the alternator A1 the current through the primary 10 of the transformer 11 is varied, changing the magnitude of current through resistance 13 to produce difference in the I R drop of potential across resistance 13. The resulting deflection of the galvanometer G2 is utilized, preferably by mechanism hereinafter described, to change the position of movable contact 1 with respect to the contacts 2 and 3 which constitute therewith a reversing switch controlling energization of the motor M2 which by mechanism similar or equivalent to that described in connection with unit 1, controls the setting of the governor R2. The steam delivered to the turbine T2 is varied, changing the load upon the alternator A2, the change in current through the primary 17 of the current transformer producing change in voltage in the resistance 19 between contact 20 and conductor 14. When balance between the potentials produced respectively between movable contact 16 and conductor 14 and between contact 20 and conductor 14 is attained, the movable element of galvanometer G2 returns to zero position for a new setting of governor R2, or other flow controlling mechanism.

Generating unit 3 to the right of broken line $y$ is similar to unit 2, the corresponding elements being indicated by the same reference characters having a sub-index of correspondingly higher order. As many of the units as it may be desired to use, may be similarly controlled, the control conductors 14, 15 being extended as shown for that purpose Briefly therefore, the voltage across resistance 13 is proportional to the load of the group of alternators A2, A3, etc., and the settings of contacts 20 determine the ratio between the individual loads of alternators A2, A3, etc., which ratio is maintained constant by the control action described, for different voltages across 13 or the portion thereof selected by adjustment of contact 16. For a different setting of contact 16, or for a different load upon alternator A1, the total load carried by alternators A2, A3 assumes a new value but the ratios of the individual loads remain the same for any given setting of contacts 20.

The controlled units may be the same capacity and character or of widely different capacities and characters, the only criteria being that they supply energy to the same system or load network.

When in addition to the master unit there are utilized two or more controlled units, the control of the controlled units is effected not only to establish a definite relation between the load upon the master unit and the individual controlled unit, but also between the loads of or upon the controlled units. In some instances, the master unit can be dispensed with, as in Fig. 4, for example, hereinafter described, in which event the load between units is distributed in accordance with the settings of their potentiometer resistances.

In the system shown in Fig. 1, the line or load system frequency is determined by the alternator A1 controlled by the frequency responsive network N, and the load ratio between all of the units is maintained at a desired value by the control circuit 14, 15. The ratio may be varied as desired, by adjustment of the slidable contacts 16, 20 and 20, of the potentiometer resistances 13, 19 and 19. Preferably when an alternator, as A2, is disconnected from the system, as by opening of switch S2, the circuit of its controlling galvanometer G2 is broken, as by switch s2. If desired, mechanical connection between the switches may be utilized to insure simultaneous operation of the switches as generically indicated by dot-dash line x. Cutting in or out of circuit one or more of the controlled units results in automatic re-apportionment of load among the active units in accordance with the ratio determined by their potentiometer settings.

Figures 2, 2A, 2B:
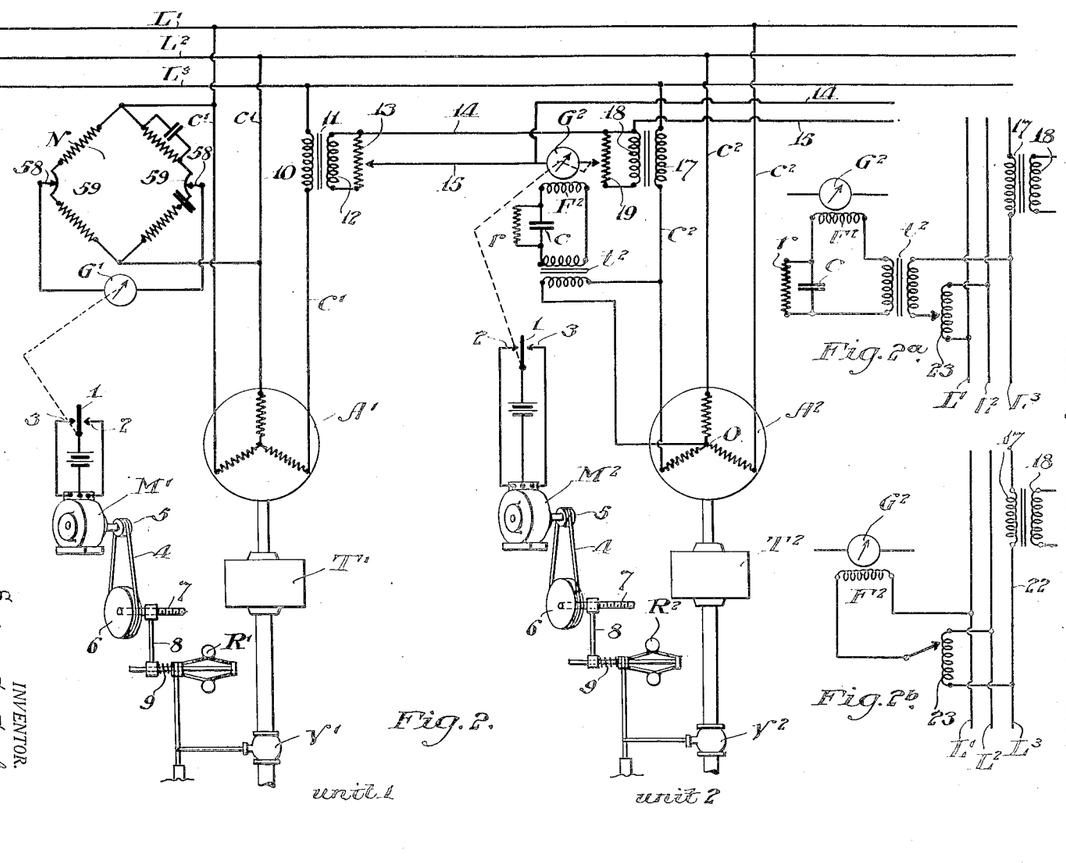
Fig. 2 discloses in diagrammatic form, generating systems supplying current to a multiphase system.
Figs. 2a and 2b are fragmentary sketches depicting modes of energizing the field winding of a galvanometer utilized in the preceding systems.

In Fig. 2 there is disclosed a system generally similar to that above described, in which the alternators A1, A2, etc. supply multiphase, specifically three-phase, current to supply conductors L1, L2 and L3. The frequency responsive network N is connected between any pair of conductors, for example L1, L2. Of unit 2, the primary 17 of the current transformer is included in a conductor C2 connected to line L3, and the field winding F2 of the galvanometer supplied by transformer t2 the terminals of whose primary are connected respectively to the same conductor C2 and to a neutral point O. Proper phase relation of the current in the field F2 is obtained by the compensating circuit c, r as above described. It will be understood that the number of controlled units may be whatever desired, and that the operation of the system is the same as that of Fig. 1, previously described.

The terminals of the primary of transformer t2, as shown in Fig. 2a, may be connected respectively, to a conductor C2 and to a selected point of an impedance, as an inductance 23, connected between the other supply conductors, or in phase L1—L2. In systems substantially free of harmonics, the compensating circuit r, c and also additionally transformer t2, may be dispensed with, one terminal of the field winding being connected to the feeder conductor connected to line L1, for example, and the other terminal to a point of inductance 23, or equivalent, connected between the remaining feeders as shown in Fig. 2b.

Figure 3:
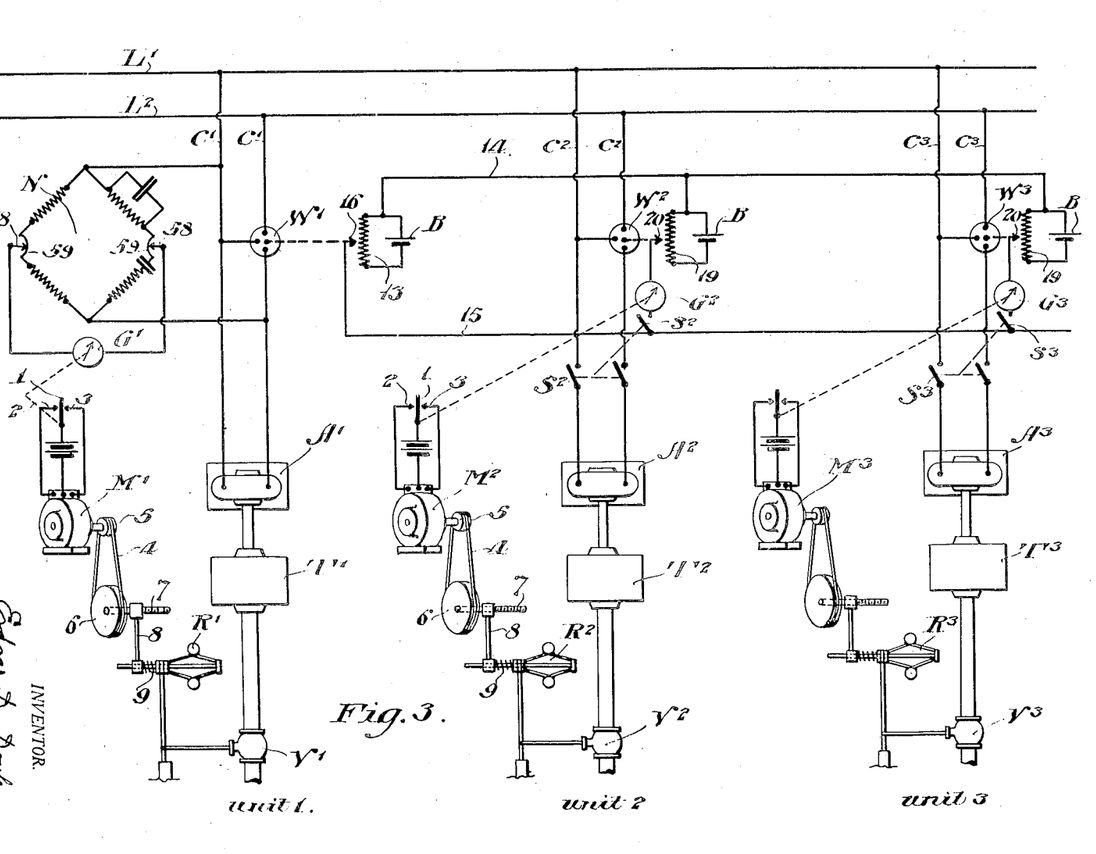
Figs. 3 and 3a illustrate modifications of the system shown in Fig. 1 utilizing other types of control.

In the modification of my invention shown in Fig. 3 in lieu of the current transformers in the output circuits of the alternators, there are utilized watt meters W1, W2 and W3, or equivalent, the movable elements of which are mechanically connected, as indicated by dotted lines, to the adjustable contacts 16, 20 and 20, of the potentiometer resistances 13, 19 and 19, preferably across each of which is connected a source of constant potential, as a battery B, like poles of the batteries being connected to conductor 14. Potential transformers may obviously be utilized in lieu of batteries. Changes in load upon the several units produce corresponding changes in the positions of the movable elements of the watt meters and therefore of potentiometer contacts 16, 20 etc. As in the previous modifications, the potentials, changes of which are produced by variations of load upon the several units, are balanced by controlling operation of the respective units in accordance with the deflections of a galvanometer connected between the control circuit conductors in series with an impedance or resistance, the effective drop of potential across which is determined by the load upon that unit. By design or selection of the potentiometer resistances, and/or the mechanical connections between the sliding contacts co-operating therewith and the movable elements of the watt meters, the load ratio of the several units may be automatically maintained constant for a range of total load, or may vary in any desired manner throughout a range of total load, or all units may be controlled to operate on points of their input-output curves having the same slope as described and claimed in my copending application Serial #305,597, filed September 12, 1928.

In the absence of control such as effected by the frequency-responsive bridge N or galvanometer G2, G3, etc., the load-speed characteristic of each unit is drooping, i. e. for increase in load the speed decreases. As above explained, the effect of bridge N is to maintain the frequency of the alternator A1, and hence the speed of A1 and its prime mover constant. Increase of the system demand momentarily causes a drop in frequency to which the bridge N responds, acting through galvanometer G1, governor R1, etc. to increase the steam delivered to prime mover T1. As the speed of the alternator is increased to resume normal frequency and balance of bridge N, the alternator tends to pick up load. The load-speed characteristic of the master unit 1 is modified in that the normal speed is maintained constant for substantial variations in load and does not except momentarily, decrease for increase of load, and vice versa. When circumstances or conditions are such that objectionable overloading of the frequency-controlled unit may occur, the arrangement shown in Figs. 1, 2, 3, 3a, in which the load-speed characteristic of one or more other units supplying energy to the same system, is or are suitably modified by change in load of the master-unit, can be utilized to advantage. As above mentioned in connection with Fig. 3, the load upon the controlled units may be apportioned as desired, the ratio varying with each change of total load to maintain high operating efficiency, for example, of a group of units of dissimilar characteristics, or the ratio of unit loads remaining fixed for varying system demand.

Figure 3A:
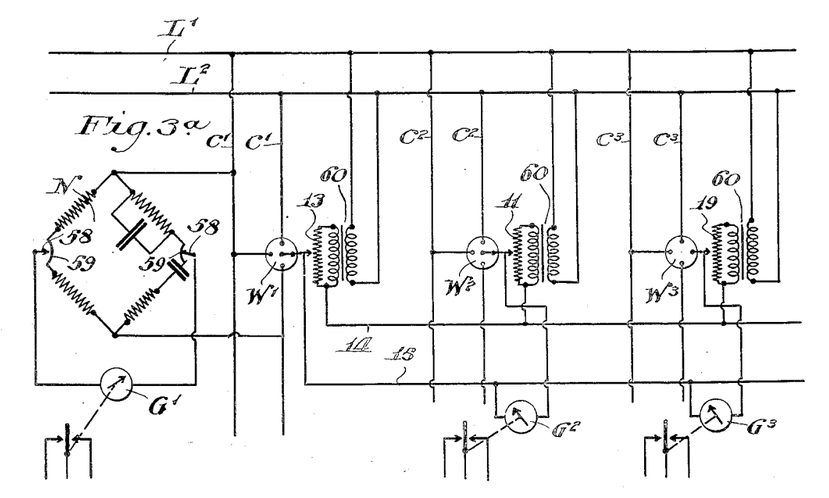

The arrangement shown in Fig. 3a is similar to that of Fig. 3. However, in lieu of batteries B, there are utilized transformers 60 whose primary windings are connected to line L1, L2, and whose secondaries are shunted by the potentiometer resistances 13, 19, 19.

Figure 4:
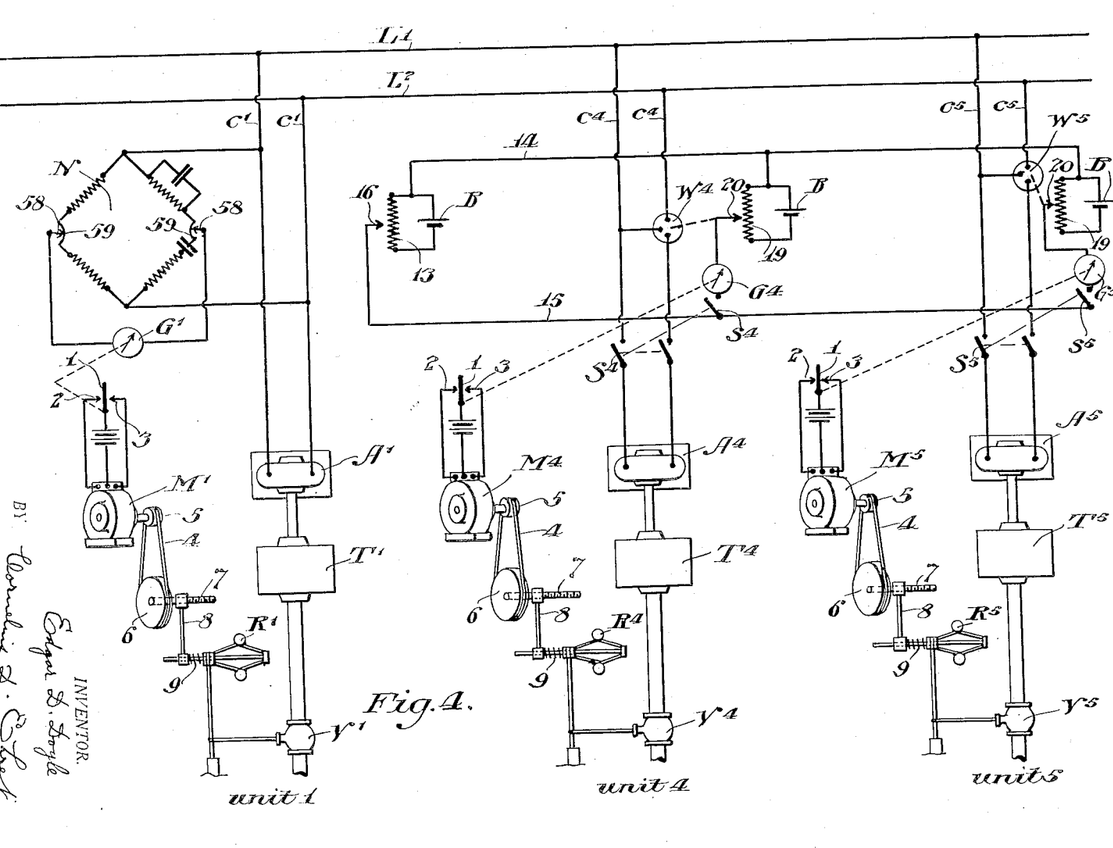
Figs. 4 and 5 diagrammatically show automatic control systems for maintaining substantially constant the load upon generating units.

In the modification of my invention shown in Fig. 4, the position of the contact 16 is manually adjustable, by an operator, to determine the total load upon units 4 and 5 and others if used which will remain constant for variations of the system demand. As in Fig. 1, the voltage across the selected portion of resistance 16 is proportional to the group load of the load-controlled alternators, which in Fig. 4 are alternators A4, A5, etc. The distribution or apportionment between units is predetermined, as aforesaid, by design and construction of the resistances 19, and/or the relation between the extents of movement of the contacts 20 with respect to their actuating means, that is, the movable elements of the watt meters 4, 5. As in the systems previously described, the line frequency is maintained substantially constant by unit 1, if and when used. Additionally, the master unit 1 may be associated with and control other units as units 2, 3, etc. of the preceding figures. It will be understood that the system of Fig. 4 may be modified to effect the same result by using potential transformers in place of the batteries to supply the local circuits of potentiometer resistances 13, 19. For brevity, the alternators, prime movers, etc. of the units have the same reference letters as the prior modifications described, the sub-index however is of different numerical value.

Figure 5:
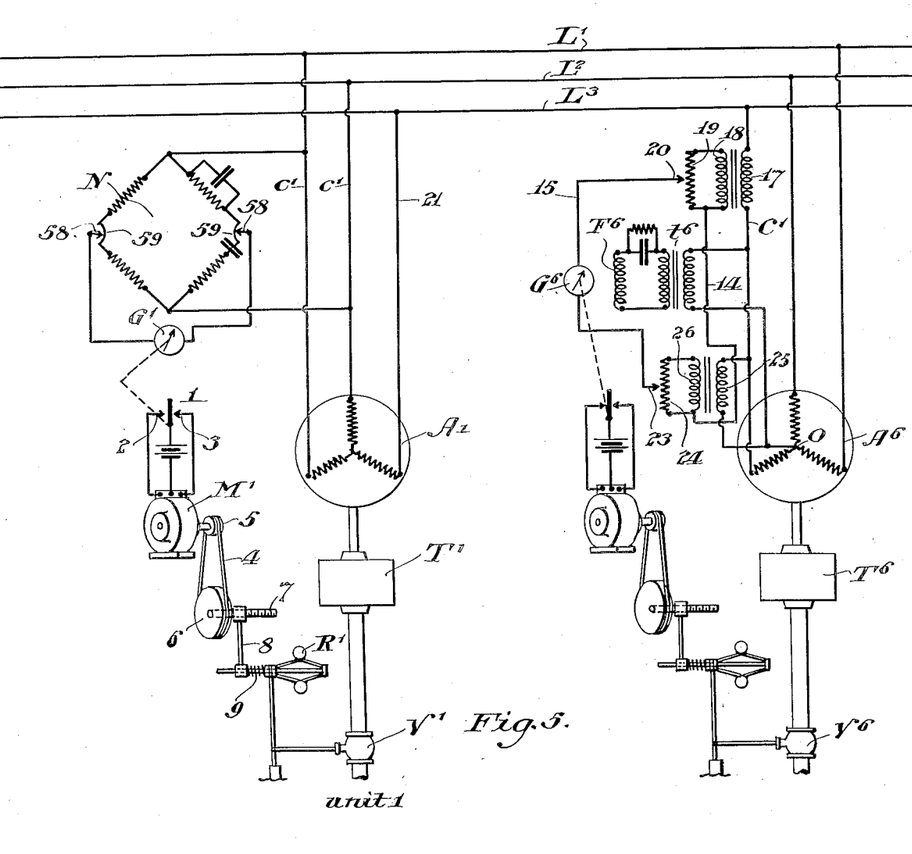

The voltage load-current ratio of a generator output, or the load, if the voltage is maintained constant, of the generator is maintained of desired or predetermined magnitude by the system shown in Fig. 5, in which the galvanometer G6 is connected to the contact 20 adjustable along resistance 19, the drop of potential across which varies with change in output current of the alternator A6, and to contact 23 adjustable along resistance 24, the drop of potential across which varies with changes in magnitude of potential in proper phase relation with the current in transformer 17, 18. As shown, the terminals of the resistance 24 are connected to the secondary terminals of a transformer the terminals of whose primary 26 are connected respectively to a conductor C1 in which the primary 17 of the transformer 17, 18 is included, and to a neutral point O. If desired the transformer 25, 26 may be dispensed with and the resistance 24 connected in series with galvanometer field F6. The contacts 20 and 23 are manually adjusted to effect the desired voltage-current ratio. Departure therefrom effects deflection of the galvanometer G6 in a corresponding sense, the movement of the galvanometer element being utilized to control, as heretofore described in connection with other figures, the magnitude of input energy delivered to the prime mover T6. Any number of units corresponding to unit 6 may be used; each, however, is controlled without substantial effect upon or by the other or others. As in the previous arrangements, the line frequency may be maintained constant by a frequency controlled unit, as the master unit #1. It is understood that to the same system, there may be connected units such as 2, 3 of Fig. 1 and/or units 4, 5 of Fig. 4.

In systems or units utilizing synchronous or rotary converters, dynamotors, etc., the bridge N or equivalent, and current transformers are connected to the alternating current side of the associated electrical system. Watt meters, if used as in Figs. 3 or 4, are or may be connected in either the alternating or direct current circuit, preferably the output circuit.

Figure 6:
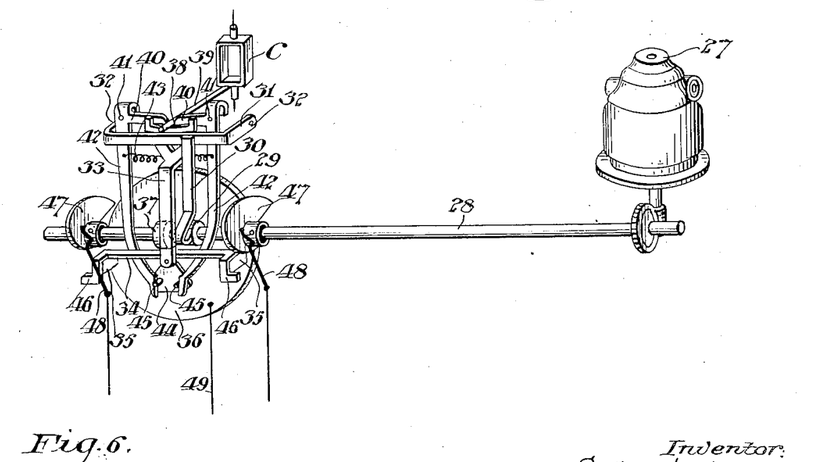
Figs. 6 and 7 are perspective views of control apparatuses capable of being utilized in the aforesaid systems.

In Fig. 6 there is disclosed one form of suitable mechanism adapted for use in the systems above described to effect control of motors M1, etc. in response to deflection of galvanometers G1, etc. An electric motor 27, or other suitable source of power, rotates at substantially constant speed a shaft 28 having thereon, or to which is attached, a cam 29 which periodically engages the depending arm 30 of a U-shaped member 31 pivoted at points 32, 32. A lever 33 is pivoted at its upper end on a horizontal axis and has pivoted thereto on a horizontal axis at its lower end, the arm 34, on each end of which is a shoe 35, of metal, or other electrical conducting material, frictionally engaging a fixed disc 36 of conductive material. Secured upon shaft 28 is a cam 37, which periodically engages the lever 33 and moves it outwardly, in opposition to a spring not shown, lifting the shoes 35 from disc or plate 36, the spring returning the shoes after predetermined rotation of cam 29. Upon the member 31 is secured element 38, whose upper edge is inclined outwardly from the center. Disposed immediately above the upper, inclined edge of member 38, is the galvanometer needle or pointer 39. Directly above pointer 39 and beneath which it normally freely swings are the members 40, 40 pivoted at 41, 41 and extending toward each other, leaving a gap of sufficient width between their inner ends for free entry of the pointer 39 when in balanced or zero position.

The pointer 39 normally swings freely between the upper edge of member 38 and the members 40, 40, which latter have the downwardly extending arms 42, 42 biased toward each other by spring 43. Attached to the lower side of the arm or lever 34 is a triangular plate 44 carrying the pins 45, 45, co-operating with the lower ends of the arms 42, 42. At opposite ends of the arm 34 are lugs 46, adapted to be engaged by cams 47, 47 similar in shape and similarly positioned and secured upon shaft 28. The cams 47, 47 are of suitable conducting material, as metal, and are insulated from the shaft 28. Suitable contact brushes 48, 48 are in constant engagement with cams 47, 47, and a conductor 49 is connected to disc 36, and therethrough with arm 34, which corresponds to the movable switch member 1 of Figs. 1 to 5, the cams 47, 47 corresponding to the contacts 2 and 3 in the same figures. When the galvanometer pointer 39 is in its central position neither of the cams 47 engages lugs 46 and the motor M remains unenergized. As the galvanometer pointer 39 deflects in one direction or the other, the arm 34 is rotated in one direction or the other bringing a lug 46, corresponding to either contact 2 or 3 of Figs. 1 to 5, into the path of movement of a cam 47, by which it is engaged and moved to its original position, the duration of mechanical and electrical engagement between the members 47 and 46 being determined by the extent of deflection of the pointer 39.

Figure 7:
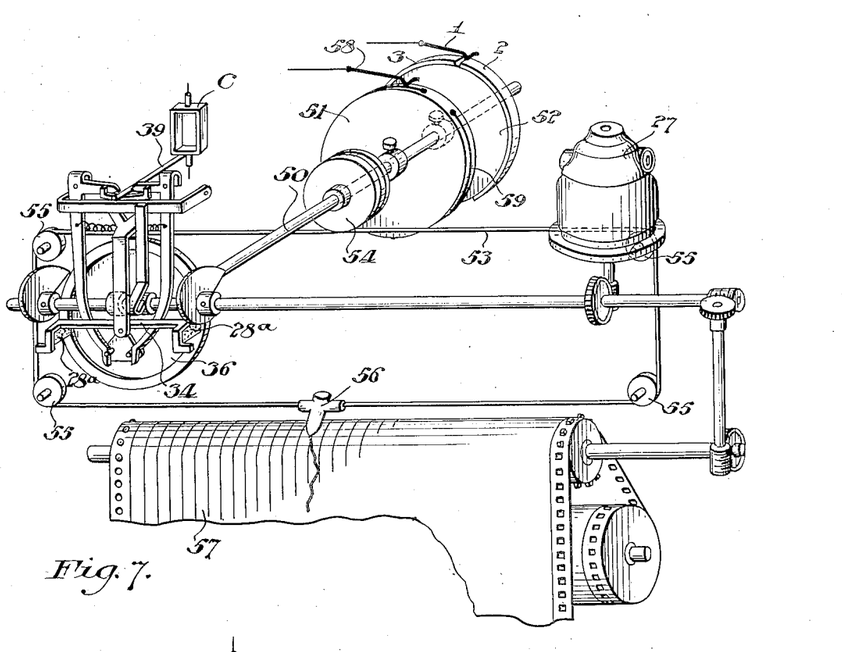

Particularly when it is desired to record frequency, or speed, the mechanism of Fig. 6 is slightly modified as shown in Fig. 7. The disc 36 instead of being fixed is supported by or upon a shaft 50 which also carries the slide wire discs 51, one of which is shown, and disc 52 carrying the contacts 2 and 3 of the motor reversing switch. A cord 53 passes around the circumference of a pulley 54 secured to shaft 50, and over idler pulleys 55 to effect movement of a pen 56, or equivalent, transversely of a recorder sheet 57 fed thereunder by suitable mechanism, driven as indicated by motor 27. Preferably to effect rotation of shaft 50 in accordance with deflections of the movable pointer 39, the shoes 28a connected to the arm 34, are of cork or other suitable material, and frictionally engage a flange portion of disc 36. The slide wire contacts 58 of the bridge N are stationary and engage slide wires 59 of the Wheatstone bridge carried by slide wire disc 51 as aforesaid.

With some power equipment, and with control installations similar to Figs. 1, 2, 3, etc., utilizing a frequency controlled master unit, there is appreciable or substantial lag between the change in load, and redistribution of the load among the units, and further the controlled machine must be of sufficiently large capacity to carry during the interval the increase in load. These difficulties are avoided by the methods disclosed in Figs. 8, 8a, 9 and 9a, and now described.

Figure 8:
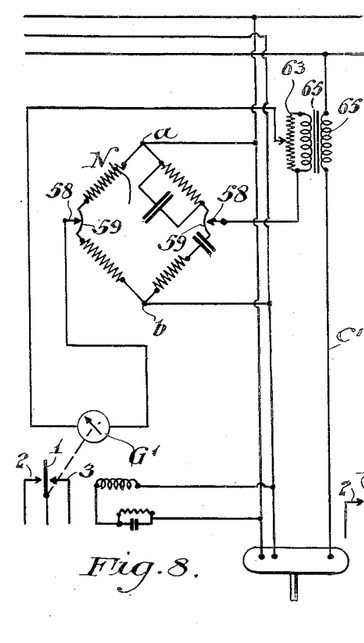
Figs. 8, 8a, 9 and 9a illustrate other applications of my invention.
Figure 8A:
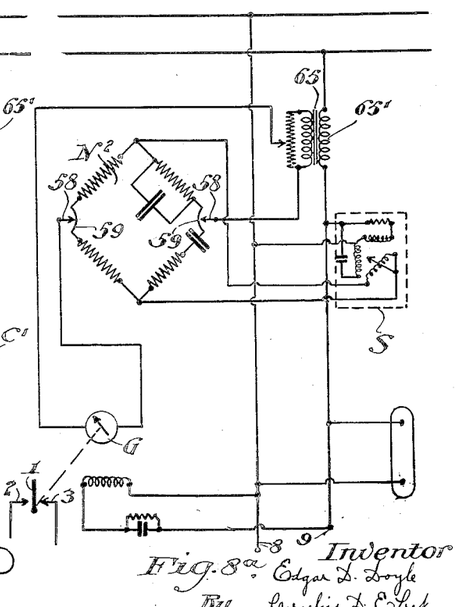

Referring to Figs. 8 and 8a, the generating unit which may be one of a group is subject to load-biased frequency control. The galvanometer G1 for example, is included in circuit between the manually adjustable slide wire contacts 58 in series with a potential varying with load upon the unit.

The potential varying with load may be produced for example, by a current transformer 65 whose primary 65' is included in a feeder C1, and whose secondary, shunted by a resistance, is connected to a slide wire contact 58 and to a terminal of the galvanometer G1.

The difference of potential developed across the contacts 58, 58 is in quadrature with the potential difference impressed on the frequency bridge at the points (a) (b), and as this difference must be in phase with the difference of potential derived from the transformers 65, it is necessary to impress on the bridge, and similarly on the field circuit of the galvanometer, a voltage in quadrature with the in-phase component of current in transformer 65. This may be done by any suitable means such as the use of a phase shifting transformer S, or equivalent, Fig. 8a, or in a three phase system Fig. 8 by connecting the bridge as shown to two conductors which do not include the current transformer primary winding 65'.

The sense of the voltage across resistance 63 with respect to the unbalanced voltage between slide wire contacts 58 is such that as the current through 65' increases the frequency at which galvanometer G1 is balanced decreases, and vice versa. The rate at which the frequency varies with change in load is predetermined by adjustment of the contact engaging resistance 63 while adjustment of slide wire contacts 58 determines the frequency at which the galvanometer is balanced for a given load. Any number of load-biased frequency controlled generators may be connected in parallel to the same line, the generators may be of like or different capacities, and may be biased to equal or varying extents.

Figure 9:
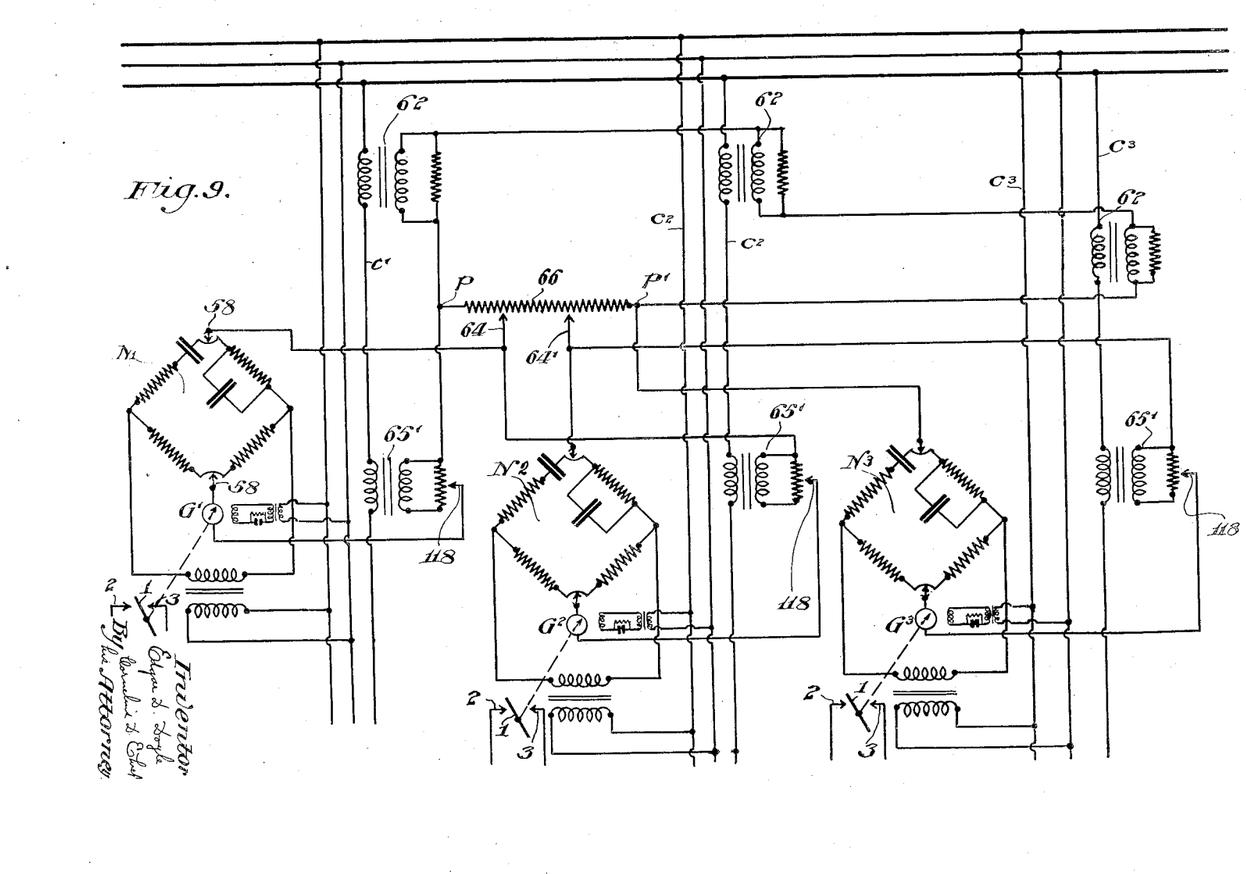

In Fig. 9, each of the generating units is subject to load-frequency control, the control circuits of the units, however, being so associated that any ratio between the loads of the machines may be selected and maintained irrespective of variations of total load. To that end, the secondaries of the current transformers 62 suitably shunted by resistance, are connected in series with a resistance 66, the current flowing through it being therefore a function of the total load upon the machines.

In series in the galvanometer arm of each of the frequency bridges N1, N2, N3, etc. is included the secondary of a current transformer 65' shunted by a resistance, and a portion of resistance 66. For example, in series between the slide wire contacts 58, 58 of bridge N1 there is included in series the galvanometer G1, the portion of the resistance shunting the secondary of transformer 65' between the manually adjustable contact 118 and the terminal $p$ of resistance 66, and the portion of resistance 66 between terminal $p$ and manually adjustable contact 64, generally similar to the arrangement of Fig. 8. The portion of resistance 66 between contacts 64 and 64' is included in circuit with galvanometer G2 and a portion of the shunting resistance of current transformer associated with second generating unit connected to feeder C2, C2. Similarly, the portion of resistance 66 between contact 64' and terminal $p'$ is included in circuit with galvanometer G3 and a portion of the shunting resistance of the current transformer in conductor C3.

Assuming the contacts 118 are so set that the drop of potential across the shunting resistance of each transformer 65' is equal to the drop of potential across the shunting resistance of a corresponding transformer 62, and further that the ratio between the potential drops across the secondaries of the groups of transformers 62, 65' in conductors C1, C2, C3, etc. are proportional to the loads of the generating units connected thereto, the resistances between P and 64, 64 and 64' and 64' and P' are proportional to the loads being carried by conductors $C_1$, $C_2$ and $C_3$ respectively.

By setting the contact 118 of one or more control circuits in such position that the drops of potential across the secondaries of the corresponding transformers 62, 65' are not equal, load-biased-frequency operation is effected.

Figure 9A:
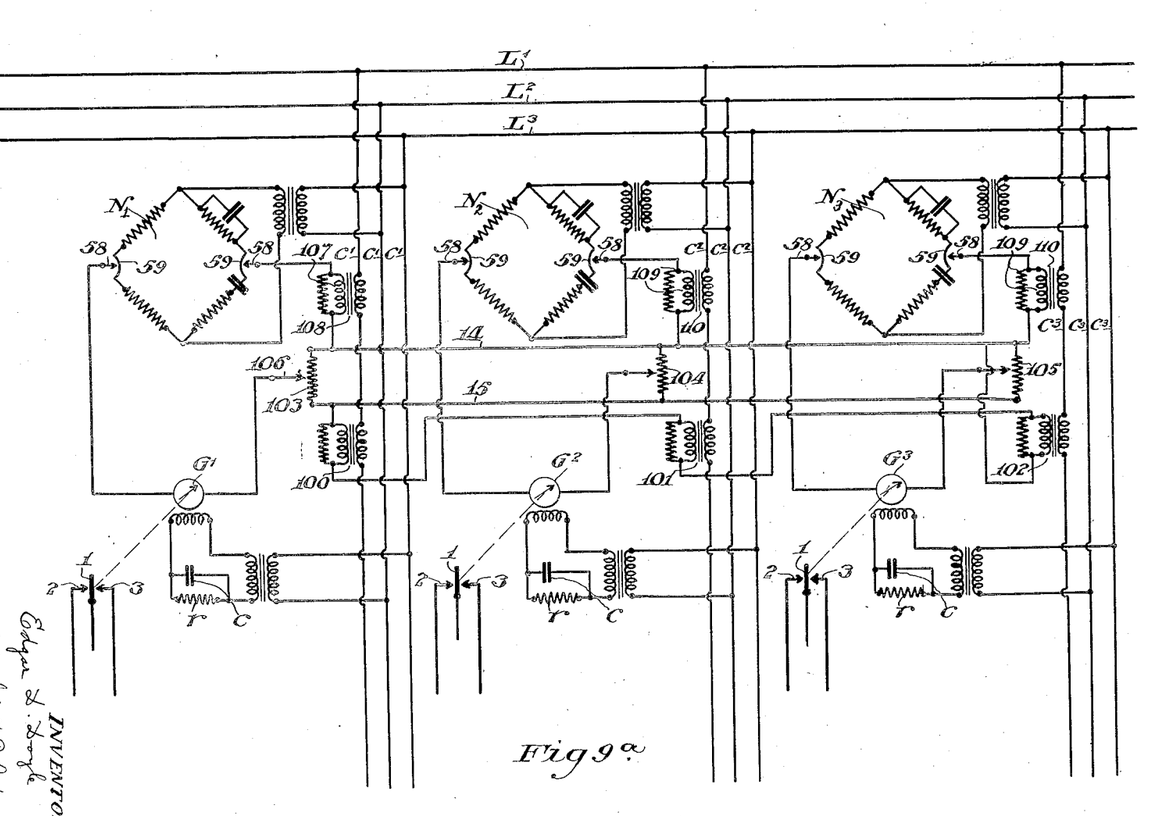

In the arrangement shown in Fig. 9a each of the units is subject to load frequency control and responds at once to change in load and/or frequency. The difference in potential between the control conductors 14, 15, is a function of the load upon the group of machines and may be produced, for example, by connecting the secondaries of current transformers 100, 101 and 102 in series across the conductors. The primaries of the transformers are included in the output circuits of the respective alternators A1, A2 and A3. The total drop of potential between control circuit conductors 14, 15 and across the potentiometer resistances 103, 104 and 105 is therefore proportional to the total load of the group.

The galvanometer G1 controlling unit 1, is connected in circuit between the slide wire contacts 58, 58 of the frequency responsive bridge N1 in series with a selected portion of a potentiometer resistance 103 of magnitude determined by setting of the manually adjustable contact 106, and with the resistance shunting the secondary 107 of a current transformer 108 whose primary is included in the output circuit of alternator A1. When the frequency is normal, and unit 1 is taking its desired share of the total load, the drops across these resistances balance and the galvanometer G1 is in neutral position. Similarly galvanometer G2 is at rest or in neutral position, when the frequency is normal, and the potential across the effective portion of potentiometer resistance 104 is balanced by that across the resistance shunting the secondary 109 of current transformer 110 in the output circuit of alternator A2. The same is true of galvanometer G3, and of as many other controlled units as are included in the system.

Upon increase in total load, there is a decrease in frequency, effecting unbalance of the bridges N1, N2 and N3 which causes a flow of current through galvanometers G1, G2 and G3. Deflection of the galvanometers G1, G2 and G3 in turn effects changes in governor settings, for example, and specifically increases of flow of steam to the turbines T1, T2 and T3.

As the units pick up the load, the potentials across the secondaries 107, 109, etc. increase, and the potentials across the potentiometer resistances 103, 104 also increase. Each unit under the influence of its control effected by its respective galvanometer tends to operate under a condition at which the potentials tending to cause flow of current through the galvanometer coil are at a balance.

When the load distribution varies without change of frequency, the control effected is solely in accordance with load.

When the settings of contacts adjustable along resistances 103, 104, 105 are such that the sum of the potentials between the contacts and conductor 14 is not equal to the sum of the potential across the secondaries of the individual current transformers 108, 110, etc., load-biased frequency control is effected.

Figs. 9 and 9a are practically identical in operation but vary in arrangement in that in Fig. 9a as the secondaries of the individual current transformers 108, 110, 110 are connected to a common conductor 14, the corresponding terminals thereof are at the same potential whereas in the arrangement shown in Fig. 9 the potentials between corresponding terminals of the individual current transformers 65' vary with load and the positions of contacts 64 and 64'.

The systems of Figs. 9 and 9a comprise a plurality of combined frequency and load control systems of Fig. 8 with provision for load distribution between alternators as in the systems of Figs. 1 to 4.

In a broad aspect, my invention is for controlling the distribution of load between a plurality of electrical translating units, particularly generating units, and more specifically, units for generating alternating current.

What I claim is:

1. In a system comprising two or more alternators, a totalizing circuit including impedance traversed by current of magnitude representative of total output of said alternators, impedances traversed by currents of magnitude determined by the loads upon the respective alternators, and means individually to control said alternators comprising a frequency-responsive bridge in whose galvanometer arm there is included one of said individual load impedances and a selected part of said impedance of said totalizing circuit.

2. In a system comprising two or more alternators, a plurality of potentiometer impedances, connections between points of said impedances each including a control instrument, means manually to adjust the potential of one of said points, means to vary the potential of each of the other points in accordance with the load of an alternator, and mechanisms controlled by said instruments to vary the input energy of said alternators.

3. In a system comprising two or more alternators, a like number of potentiometer impedances included in a control circuit, one or more instruments each connected between a control circuit conductor and a point of a corresponding impedance, means to vary the potential of said points, each in accordance with the load upon an associated alternator, and mechanisms controlled by said instruments to vary the input energy of the alternators.

4. In a system comprising two or more alternators, current transformers in feeder conductors therefrom, resistances in shunt to the secondaries of said transformers, a control circuit including a conductor connecting like terminals of the secondaries of said transformers, instruments connected between a second conductor of said circuit and respective resistances, and mechanism controlled by said instruments to vary the input energy of the alternators.

5. A load distribution system for a group of generators comprising means for producing an electrical force of magnitude substantially proportional to group load, a plurality of means, each producing an electrical force substantially proportional to the individual load of a generator, and a plurality of means for controlling said generators, each responsive to unbalance between said first electrical force and the electrical force proportional to the load of the generator controlled thereby.

6. A load distribution system for a group of generators comprising an electrical network, means for producing in said network a voltage substantially proportional to group load, a plurality of means, each producing in said network a voltage substantially proportional to the individual load of a generator, and a plurality of means for controlling the inputs to said generators, each responsive to unbalance between the voltage proportional to the load of the generator controlled thereby and said other voltages, whereby the load ratios of the generators are maintained substantially constant.

7. A load distribution system for a group of electrical translating units comprising means for producing an electrical force of magnitude substantially proportional to group load, a plurality of means, each producing an electrical force substantially proportional to the individual load of a unit, and a plurality of means for controlling the inputs to said units, each responsive to unbalance between said first electrical force and the electrical force proportional to the load of the unit controlled thereby.

8. A load distribution system for a group of generators comprising means for producing an electrical force of magnitude substantially proportional to group load, a plurality of means, each producing an electrical force substantially proportional to the individual load of a generator, a plurality of means for controlling said generators, each responsive to unbalance between said first electrical force and the electrical force proportional to the load of the generator controlled thereby, and means for varying said first voltage in accordance with changes of the total load of the group.

9. A load distribution system for a group of alternators comprising a plurality of frequency-responsive networks for individually controlling the alternators, means for producing a voltage substantially proportional to total load of the group, a plurality of means, each producing a voltage substantially proportional to the individual load of an alternator, and connections for introducing into the frequency-responsive network of each alternator the difference between the voltage proportional to the individual load of the alternator and the voltage proportional to group load.

10. A load distribution system for a group of alternators comprising a plurality of frequency-responsive networks for individually controlling the alternators, means for introducing into each of said networks a voltage substantially proportional to the load of the alternator controlled thereby, and means for introducing into each of said networks a voltage, effectively in series with said first voltage, and proportional to departure of the ratio of the individual load to the group load from a desired value.

11. A control system for an alternator comprising a frequency-responsive Wheatstone bridge for controlling the alternator, and means for introducing into a conjugate conductor of said bridge a voltage substantially proportional to the alternator load.

12. A load distribution system for a group of generators comprising a totalizing circuit including impedance traversed by current of magnitude representative of the group load, a plurality of means, each producing a voltage substantially proportional to the individual load of an alternator, and a plurality of means for individually controlling said alternators, each responsive to unbalance between the voltage substantially proportional to the load of the alternator controlled thereby and a preselected portion of the total voltage across said impedance.

13. A load distribution system for a group of alternators comprising a totalizing circuit including a tapped impedance traversed by current of magnitude substantially proportional to the group load, and a plurality of means for individually controlling the alternators, each comprising a frequency-responsive bridge in whose galvanometer arm is included a portion of said impedance between adjacent taps.

14. A load distribution system for a group of alternators comprising a totalizing circuit including impedance traversed by current whose magnitude is substantially proportional to the group load, means for deriving therefrom a plurality of voltages whose sum may differ from the voltage across said impedance, a plurality of means for individually controlling the alternators, each comprising a frequency-responsive network, and connections for introducing into each of said networks one of said derived voltages.

EDGAR D. DOYLE.